United States Patent
Dong et al.

(10) Patent No.: US 12,355,255 B2
(45) Date of Patent: Jul. 8, 2025

(54) INVERTER, POWER GRID POWER SUPPLY SYSTEM, AND METHOD FOR CONTROLLING EXCITATION INRUSH CURRENT

(71) Applicant: Huawei Digital Power Technologies Co., Ltd., Shenzhen (CN)

(72) Inventors: Mingxuan Dong, Shanghai (CN); Shuo Wang, Shanghai (CN); Jie Chen, Shanghai (CN); Wenchao Li, Shanghai (CN); Mingquan Zhao, Shanghai (CN); Kai Xin, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 21 days.

(21) Appl. No.: 18/393,156

(22) Filed: Dec. 21, 2023

(65) Prior Publication Data
US 2024/0213783 A1    Jun. 27, 2024

(30) Foreign Application Priority Data
Dec. 23, 2022   (CN) .......................... 202211660145.5

(51) Int. Cl.
*H02J 3/38* (2006.01)
*H02J 3/32* (2006.01)
*H02J 3/46* (2006.01)

(52) U.S. Cl.
CPC ................ *H02J 3/381* (2013.01); *H02J 3/32* (2013.01); *H02J 3/46* (2013.01); *H02J 2300/24* (2020.01)

(58) Field of Classification Search
CPC ....... H92J 3/38; H92J 3/381; H92J 3/32; H92J 3/46; H92J 2300/24
See application file for complete search history.

(56) References Cited

U.S. PATENT DOCUMENTS 7,075,764 B2    7/2006 Wahlroos et al.
2017/0222429 A1    8/2017 Turner

FOREIGN PATENT DOCUMENTS

| CN | 104242353 A | 12/2014 |
| CN | 107431349 A | 12/2017 |
| CN | 110048448 A | 7/2019 |
| CN | 110943472 A | 3/2020 |
| CN | 112701730 A | 4/2021 |

OTHER PUBLICATIONS

Zhi Chen, "An inrush current mitigation approach of the output transformer for inverter", 2015 IEEE Applied Power Electronics Conference and Exposition (APEC), Mar. 1, 2015, 2295-2300, XP093158613, total 6 pages.

*Primary Examiner* — Robert L Deberadinis
(74) *Attorney, Agent, or Firm* — Slater Matsil, LLP

(57) ABSTRACT

This application provides an inverter, a power grid power supply system, and a method for controlling an excitation inrush current. The controller adjusts the output voltage of the conversion circuit based on a first phase that is of the output voltage of the conversion circuit and that is during reduction of the output voltage, the magnetic flux of the iron core in the transformer, an output voltage that is of the conversion circuit and that is after the output voltage is reduced, and the target voltage value, so as to increase the output voltage of the conversion circuit and keep the magnetic flux of the iron core less than the saturation magnetic flux.

14 Claims, 4 Drawing Sheets

INVERTER, POWER GRID POWER SUPPLY SYSTEM, AND METHOD FOR CONTROLLING EXCITATION INRUSH CURRENT

CROSS-REFERENCE TO RELATED APPLICATION

This application claims priority to Chinese Patent Application No. 202211660145.5, filed on Dec. 23, 2022, which is hereby incorporated by reference in its entirety.

TECHNICAL FIELD

This application relates to the field of electronic power, and in particular, to an inverter, a power grid power supply system, and a method for controlling an excitation inrush current.

BACKGROUND

When a transformer is connected to a power grid through no-load switch-on, and residual magnetic flux in an iron core before the transformer is connected is in a same direction as magnetic flux generated by an operating voltage when the transformer is connected, total magnetic flux of the transformer is far greater than saturation magnetic flux of the iron core, and the iron core in the transformer is saturated instantaneously. In this way, an excessively large excitation inrush current (of which a maximum peak value may reach 6 to 8 times of a rated current of the transformer) is generated. The excitation inrush current contains a large even current, which causes midpoint potential divergence protection of a multi-level inverter, and the transformer may be damaged due to the excessive excitation inrush current. Currently, a method for controlling an excitation inrush current generated during no-load switch-on is mainly to introduce an additional bypass branch to prevent the transformer from being directly connected to the power grid, or to actively reduce a voltage, and reduce the excitation inrush current in a manner of soft-start after voltage reduction. However, reducing the excitation inrush current through the additional bypass branch introduces new hardware, which increases system costs; and the manner of soft-start after voltage reduction may cause failure of the entire power grid, reliability of supplying power to a load is reduced, and some relay protection apparatuses may be mistakenly operated.

SUMMARY

Embodiments of this application provide an inverter, a power grid power supply system, and a method for controlling an excitation inrush current, so as to prevent a midpoint potential divergence of the inverter and damage to the inverter caused by an excitation inrush current, and avoid failure of the entire power grid caused by maintaining of a low voltage level, thereby improving power supply reliability of the power grid power supply system.

According to a first aspect, this application provides an inverter, where the inverter is applicable to a power grid power supply system, an input end of the inverter is coupled to a power supply, an output end of the inverter is coupled to an alternating current power grid via a transformer, and the inverter includes a conversion circuit and a controller, where the controller is configured to: when an output current of the conversion circuit is greater than a current threshold, reduce an output voltage of the conversion circuit, to enable magnetic flux of an iron core in the transformer to be less than saturation magnetic flux to reduce an excitation inrush current; and the controller is further configured to: after reducing the output voltage of the conversion circuit, adjust the output voltage of the conversion circuit based on a first phase that is of the output voltage of the conversion circuit and that is during reduction of the output voltage, remnant magnetism that is of the iron core in the transformer and that is before and after the output voltage is reduced, a maximum value of an output voltage of the conversion circuit, a target voltage value, and angular frequency of the output voltage of the conversion circuit, so as to increase the output voltage of the conversion circuit to the target voltage value and keep the magnetic flux of the iron core in the transformer less than the saturation magnetic flux.

In this application, the inverter may include the conversion circuit and the controller. The conversion circuit is configured to perform inversion conversion based on a voltage and a current at the input end of the inverter. When the inverter is connected to the alternating current power grid through full-voltage hard switching (or is connected to the alternating current power grid through no-load switch-on), the inverter may detect whether the excitation inrush current occurs. The inverter may obtain the output current of the conversion circuit via the controller, and when the output current of the conversion circuit is greater than the current threshold, control reduction of the output voltage of the conversion circuit, to enable the magnetic flux of the iron core in the transformer to be less than the saturation magnetic flux to reduce the excitation inrush current. Further, after the controller reduces the output voltage of an alternating current module, the inverter may further adjust the output voltage of the conversion circuit via the controller based on a phase that is of the output voltage of the conversion circuit and that is during reduction of the output voltage, the remnant magnetism that is of the iron core in the transformer and that is before and after the output voltage is reduced, the maximum value of the output voltage that is of the conversion circuit and that is after the output voltage is reduced, the target voltage value, and the angular frequency of the output voltage of the conversion circuit. Herein, the controller may increase the output voltage of the conversion circuit to the target voltage value, and keep the magnetic flux of the iron core in the transformer less than the saturation magnetic flux. When the excitation inrush current occurs, the inverter controls reduction of the output voltage of the conversion circuit via the controller, to exit the saturation magnetic flux, so as to avoid the excitation inrush current generated because the magnetic flux of the iron core in the transformer is saturated, and prevent a midpoint potential divergence of the inverter and damage to the inverter. In addition, the controller may further recover the output voltage of the conversion circuit, and a process of recovering the voltage does not cause the magnetic flux to be saturated again, thereby avoiding failure of the entire power grid caused by maintaining of a low voltage level, and improving power supply reliability of the power grid power supply system.

With reference to the first aspect, in a first possible implementation, the magnetic flux of the iron core in the transformer includes alternating current magnetic flux and direct current magnetic flux, and the controller is configured to: when the output current of the conversion circuit is greater than the current threshold, reduce the output voltage of the conversion circuit to reduce the alternating current magnetic flux of the iron core in the transformer until a sum of the alternating current magnetic flux of the iron core in the transformer and first direct current magnetic flux generated by the transformer when the controller reduces the voltage is less than the saturation magnetic flux. When the excitation inrush current occurs, the inverter controls reduction of the output voltage of the conversion circuit via the controller, to exit the saturation magnetic flux, so as to avoid the excitation inrush current generated because the magnetic flux of the iron core in the transformer is saturated, and prevent the midpoint potential divergence of the inverter and the damage to the inverter.

With reference to the first possible implementation of the first aspect, in a second possible implementation, the controller is further configured to: obtain a second phase based on the first phase that is of the output voltage of the conversion circuit and that is during reduction of the output voltage, the remnant magnetism that is of the iron core in the transformer and that is before and after the output voltage is reduced, the maximum value of the output voltage that is of the conversion circuit and that is after the output voltage is reduced, the target voltage value, and the angular frequency of the output voltage of the conversion circuit, and increase the output voltage of the conversion circuit when a phase of the output voltage of the conversion circuit is equal to the second phase, so that when the output voltage of the conversion circuit reaches the target voltage value, a sum of the alternating current magnetic flux of the iron core in the transformer, the first direct current magnetic flux, and second direct current magnetic flux generated by the transformer when the controller increases the voltage is less than the saturation magnetic flux. The controller increases the voltage of the output end when the phase of the output voltage of the conversion circuit is the second phase, so that pieces of the direct current magnetic flux generated by the inverter during voltage increase and reduction are offset, and the sum of the alternating current magnetic flux after voltage increase and the offset direct current magnetic flux still does not exceed the saturation magnetic flux, so as to ensure that the magnetic flux of the iron core in the transformer is still less than the saturation magnetic flux after the output voltage of the conversion circuit is increased (which may be that the output voltage reaches the target voltage value). The controller may recover the output voltage of the conversion circuit, and a process of recovering the voltage based on the second phase does not cause the magnetic flux to be saturated again, thereby avoiding the failure of the entire power grid caused by maintaining the low voltage level, and improving the power supply reliability of the power grid power supply system.

With reference to the first possible implementation of the first aspect, in a third possible implementation, the controller is further configured to: when the output current of the conversion circuit is not greater than the current threshold, adjust output impedance of the inverter to increase, so as to increase impedance of a transmission line between the inverter and the alternating current power grid. The impedance of the transmission line is increased to accelerate an attenuation speed of the direct current magnetic flux, to further avoid the excitation inrush current generated because the magnetic flux of the iron core in the transformer is saturated, and prevent the midpoint potential divergence of the inverter and the damage to the inverter.

According to a second aspect, this application provides a power grid power supply system. The power grid power supply system includes a power supply and the inverter provided in any one of the first aspect and the possible implementations of the first aspect. The power supply is configured to provide a direct current input for the inverter.

With reference to the second aspect, in a first possible implementation, the power grid power supply system further includes a direct current DC/DC converter, and the power supply is coupled to an input end of the inverter through the DC/DC converter. The DC/DC converter is configured to: perform direct current power conversion based on the direct current input provided by the power supply, and output, to the inverter, a direct current obtained through the direct current power conversion.

In this application, based on the inverter provided in the first aspect, an excitation inrush current generated because magnetic flux of an iron core in a transformer is saturated can be avoided, and a midpoint potential divergence of the inverter and damage to the inverter are avoided. In addition, the inverter may further recover an output voltage of a conversion circuit via a controller, and a process of recovering the voltage does not cause the magnetic flux to be saturated again, thereby avoiding failure of the entire power grid caused by maintaining of a low voltage level, and improving power supply reliability of the power grid power supply system.

According to a third aspect, this application provides a method for controlling an excitation inrush current in a power grid power supply system, where the method is applicable to an inverter in the power grid power supply system, the power grid power supply system includes a power supply, a transformer, and the inverter, an input end of the inverter is coupled to the power supply, an output end of the inverter is coupled to an alternating current power grid via the transformer, and the inverter includes a conversion circuit and a controller. In the method, the controller detects an output current of the conversion circuit, and reduces an output voltage of the conversion circuit when the output current of the conversion circuit is greater than a current threshold, to enable magnetic flux of an iron core in the transformer to be less than saturation magnetic flux to reduce an excitation inrush current. After reducing the output voltage of the conversion circuit, the controller adjusts the output voltage of the conversion circuit based on a first phase that is of the output voltage of the conversion circuit and that is during reduction of the output voltage, remnant magnetism that is of the iron core in the transformer and that is before and after the output voltage is reduced, a maximum value of an output voltage that is of the conversion circuit and that is after the output voltage is reduced, a target voltage value, and angular frequency of the output voltage of the conversion circuit, so as to increase the output voltage of the foregoing conversion circuit to the target voltage value and keep the magnetic flux of the iron core in the foregoing transformer less than the saturation magnetic flux. When the excitation inrush current occurs, the inverter controls reduction of the output voltage of the conversion circuit via the controller, to exit the saturation magnetic flux, so as to avoid the excitation inrush current generated because the magnetic flux of the iron core in the transformer is saturated, and prevent a midpoint potential divergence of the inverter and damage to the inverter. In addition, the controller may further recover the output voltage of the conversion circuit, and a process of recovering the voltage does not cause the magnetic flux to be saturated again, thereby avoiding failure of the entire power grid caused by maintaining of a low voltage level, and improving power supply reliability of the power grid power supply system.

With reference to the third aspect, in a first possible implementation, the magnetic flux of the iron core in the transformer includes alternating current magnetic flux and direct current magnetic flux, and that the controller detects an output current of the conversion circuit, and reduces an output voltage of the conversion circuit when the output current of the conversion circuit is greater than a current threshold includes: When the output current of the conversion circuit is greater than the current threshold, the controller reduces the output voltage of the conversion circuit until a sum of the alternating current magnetic flux of the iron core in the transformer and first direct current magnetic flux generated by the transformer when the controller reduces the voltage is less than the saturation magnetic flux. When the excitation inrush current occurs, the inverter controls reduction of the output voltage of the conversion circuit via the controller, to exit the saturation magnetic flux, so as to avoid the excitation inrush current generated because the magnetic flux of the iron core in the transformer is saturated, and prevent the midpoint potential divergence of the inverter and the damage to the inverter.

With reference to the first possible implementation of the third aspect, in a second possible implementation, the adjusting the output voltage of the conversion circuit based on a first phase that is of the output voltage of the conversion circuit and that is during reduction of the output voltage, remnant magnetism that is of the iron core in the transformer and that is before and after the output voltage is reduced, a maximum value of an output voltage that is of the conversion circuit and that is after the output voltage is reduced, a target voltage value, and angular frequency of the output voltage of the conversion circuit includes: The controller obtains a second phase based on the first phase that is of the output voltage of the conversion circuit and that is during reduction of the output voltage, the remnant magnetism that is of the iron core in the transformer and that is before and after the output voltage is reduced, the maximum value of the output voltage that is of the conversion circuit and that is after the output voltage is reduced, the target voltage value, and the angular frequency of the output voltage of the conversion circuit, and increases the output voltage of the conversion circuit when a phase of the output voltage of the conversion circuit is equal to the second phase, where a sum of the first direct current magnetic flux and second direct current magnetic flux that is generated by the transformer when the controller increases the voltage is not greater than zero. The controller increases the voltage of the output end when the phase of the output voltage of the conversion circuit is the second phase, so that pieces of the direct current magnetic flux generated by the inverter during voltage increase and reduction are offset, and the sum of the alternating current magnetic flux after voltage increase and the offset direct current magnetic flux still does not exceed the saturation magnetic flux, so as to ensure that the magnetic flux of the iron core in the transformer is still less than the saturation magnetic flux after the output voltage of the conversion circuit is increased (which may be that the output voltage reaches the target voltage value). The controller may recover the output voltage of the conversion circuit, and a process of recovering the voltage based on the second phase does not cause the magnetic flux to be saturated again, thereby avoiding the failure of the entire power grid caused by maintaining the low voltage level, and improving the power supply reliability of the power grid power supply system.

With reference to the third aspect, in a third possible implementation, the method further includes: When the output current of the conversion circuit is not greater than the current threshold, the controller adjusts output impedance of the inverter to increase, so as to increase impedance of a transmission line between the inverter and the alternating current power grid, so as to accelerate attenuation of direct current magnetic flux. The impedance of the transmission line is increased to accelerate an attenuation speed of the direct current magnetic flux, to further avoid the excitation inrush current generated because the magnetic flux of the iron core in the transformer is saturated, and prevent the midpoint potential divergence of the inverter and the damage to the inverter.

DESCRIPTION OF EMBODIMENTS

Figure 1:
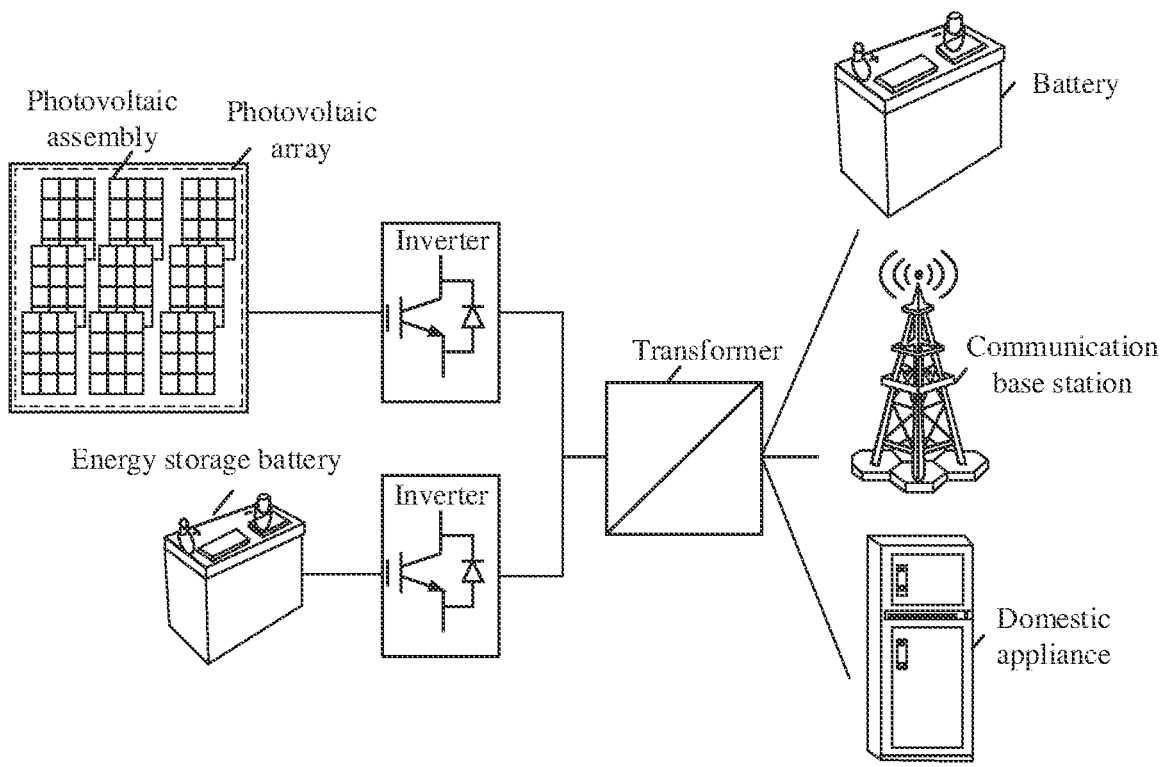
FIG. 1 is a schematic diagram of an application scenario of a power grid power supply system according to this application.

FIG. 1 is a schematic diagram of an application scenario of a power grid power supply system according to this application. The power grid power supply system provided in this application may include a power supply, an inverter, and a transformer. The power supply may include a photovoltaic array. An output end of the photovoltaic array may be connected to an input end of the inverter (or a direct current end of the inverter). An output end of the inverter (or an alternating current end of the inverter) is connected to an alternating current power grid via the transformer. Alternatively, in an off-grid scenario, an output end of the inverter is directly connected to a load via the transformer. In the power grid power supply system shown in FIG. 1, the photovoltaic array may include one or more photovoltaic strings that are connected in parallel, and one photovoltaic string may be obtained by connecting one or more photovoltaic assemblies in series. The inverter performs inversion conversion on a direct current provided by the photovoltaic array, and outputs, to the transformer, an alternating current obtained through the inversion conversion. The transformer performs voltage conversion on the alternating current output by the inverter, and outputs an alternating current after voltage increase or reduction to the alternating current power grid, to supply power to the alternating current power grid or the load (which may be current-using equipment such as a battery, a communication base station, or a domestic appliance).

In some feasible implementations, refer to FIG. 1. The power supply may further include an energy storage battery. An output end of the energy storage battery may be connected to the input end of the inverter, and the output end of the inverter is connected to the alternating current power grid via the transformer. The inverter performs inversion conversion on a direct current provided by the energy storage battery, and outputs, to the transformer, an alternating current obtained through the inversion conversion. The transformer performs voltage conversion on the alternating current output by the inverter, and outputs an alternating current after voltage increase or reduction to the alternating current power grid, to supply power to the current-using equipment, such as the battery, the communication base station, or the domestic appliance, that is in the alternating current power grid.

In the application scenario shown in FIG. 1, in a process in which the power grid power supply system supplies power to the alternating current power grid, the transformer may be connected to the alternating current power grid through full-voltage hard switching (or operate in the alternating current power grid through no-load switch-on). When remaining magnetic flux in an iron core before the transformer operates is in a same direction as magnetic flux generated by an operating voltage when the transformer operates, total magnetic flux of the transformer is far greater than saturation magnetic flux of the iron core, and the iron core in the transformer is saturated instantaneously. In this way, an excessively large excitation inrush current (of which a maximum peak value may reach 6 to 8 times of a rated current of the transformer) is generated. The excitation inrush current contains a large even current, which causes midpoint potential divergence protection of the inverter (such as a multi-level inverter). The inverter may be damaged due to the excessive excitation inrush current, and consequently the power grid power supply system cannot normally supply power (for example, when impedance of a line between the inverter and the transformer is greater than impedance of a line between the power grid and the transformer). Currently, a method for controlling an excitation inrush current generated when an alternating current power grid is connected through full-voltage hard switching is mainly to introduce an additional bypass branch to prevent the inverter from being directly connected to the power grid, or to actively reduce a voltage, and reduce the excitation inrush current in a manner of soft-start after voltage reduction. However, reducing the excitation inrush current through the additional bypass branch introduces new hardware, and increases costs and complexity of the power grid power supply system; and the manner of soft-start after voltage reduction may cause failure of the entire power grid, power supply reliability of the power grid power supply system is reduced, and some relay protection apparatuses may be mistakenly operated.

In the power grid power supply system provided in this application, the inverter may include a conversion circuit and a controller. The conversion circuit is configured to perform inversion conversion based on a voltage and a current at the input end of the inverter. The inverter may obtain an output current of the conversion circuit via the controller, and when the output current of the conversion circuit is greater than a current threshold, control reduction of an output voltage of the conversion circuit, to enable magnetic flux of the iron core in the transformer to be less than the saturation magnetic flux to reduce the excitation inrush current. Further, after the controller reduces the output voltage of an alternating current module, the inverter may further adjust the output voltage of the conversion circuit via the controller based on a phase that is of the output voltage of the conversion circuit and that is during reduction of the output voltage, remnant magnetism that is of the iron core in the transformer and that is before and after the output voltage is reduced, a maximum value of an output voltage that is of the conversion circuit and that is after the output voltage is reduced, a target voltage value, and angular frequency of the output voltage of the conversion circuit. Herein, the controller may increase the output voltage of the conversion circuit to the target voltage value, and keep the magnetic flux of the iron core in the transformer less than the saturation magnetic flux. When the excitation inrush current occurs, the inverter controls reduction of the output voltage of the conversion circuit via the controller, to exit the saturation magnetic flux, so as to avoid the excitation inrush current generated because the magnetic flux of the iron core in the transformer is saturated, and prevent a midpoint potential divergence of the inverter and damage to the inverter. In addition, the controller may further recover the output voltage of the conversion circuit, and a process of recovering the voltage does not cause the magnetic flux to be saturated again, thereby avoiding the failure of the entire power grid caused by maintaining of a low voltage level, and improving the power supply reliability of the power grid power supply system.

Figure 2:
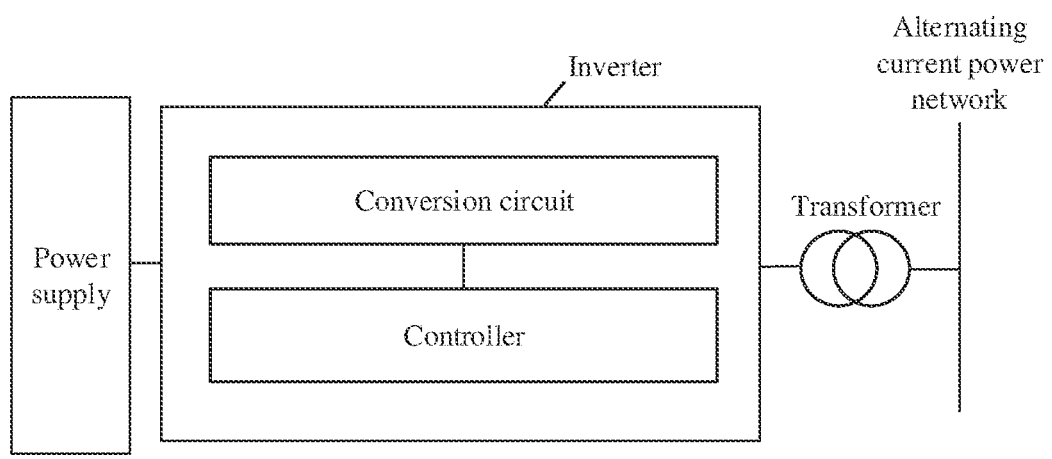
FIG. 2 is a schematic diagram of a structure of a power grid power supply system according to this application.

FIG. 2 is a schematic diagram of a structure of a power grid power supply system according to this application. The power grid power supply system shown in FIG. 2 includes a power supply, an inverter, and a transformer. The power supply may be a solar energy panel, an energy storage battery, or the like. An input end of the inverter is connected to the power supply that is in the power grid power supply system, and an output end of the inverter is coupled to an alternating current power grid through the transformer. In the power grid power supply system shown in FIG. 2, the inverter performs inversion conversion on a direct current provided by the power supply, and outputs, to the transformer, an alternating current (which may be a first alternating current) obtained through the inversion conversion. The transformer performs voltage conversion on the alternating current output by the inverter, and outputs an alternating current (which may be a second alternating current) after voltage increase or reduction to the alternating current power grid, to supply power to current-using equipment, such as a battery, a communication base station, or a domestic appliance, that is in the alternating current power grid.

Figure 3:
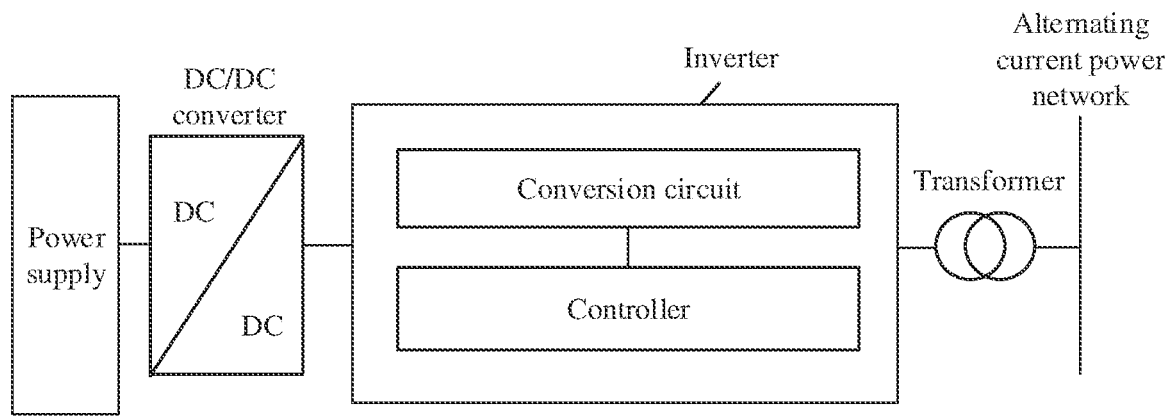
FIG. 3 is another schematic diagram of a structure of a power grid power supply system according to this application.

FIG. 3 is another schematic diagram of a structure of a power grid power supply system according to this application. As shown in FIG. 3, the power grid power supply system may include a power supply, an inverter, a direct current DC/DC converter, and a transformer. The power supply may be a solar energy panel, an energy storage battery, or the like. An input end of the inverter is coupled to the power supply that is in the power grid power supply system via the DC/DC converter, and an output end of the inverter is coupled to an alternating current power grid through the transformer. In the power grid power supply system shown in FIG. 3, the DC/DC converter performs voltage conversion on a direct current output by the power supply. The inverter performs inversion conversion on a direct current that is output by the DC/DC converter and that is obtained through the voltage conversion, and outputs, to the transformer, an alternating current (which may be a first alternating current) obtained through the inversion conversion. The transformer performs voltage conversion on the first alternating current, and outputs an alternating current (which may be a second alternating current) after voltage increase or reduction to the alternating current power grid, to supply power to current-using equipment, such as a battery, a communication base station, or a domestic appliance, that is in the alternating current power grid.

In some feasible implementations, in the power grid power supply system shown in FIG. 2 or FIG. 3, the inverter includes a conversion circuit and a controller, and the inverter may perform, via the conversion circuit, inversion conversion on the direct current output by the power supply. The inverter may obtain an output current of the conversion circuit via the controller, and when the output current of the conversion circuit is greater than a current threshold, control reduction of an output voltage of the conversion circuit, to enable magnetic flux of an iron core in the transformer to be less than saturation magnetic flux to reduce an excitation inrush current. Further, after the controller reduces the output voltage, the inverter may further adjust the output voltage of the conversion circuit via the controller based on a phase that is of the output voltage of the conversion circuit and that is during reduction of the output voltage, remnant magnetism that is of the iron core in the transformer and that is before and after the output voltage is reduced, a maximum value of an output voltage that is of the conversion circuit and that is after the output voltage is reduced, a target voltage value, and angular frequency of the output voltage of the conversion circuit. Herein, the controller may increase the output voltage of the conversion circuit to the target voltage value, and keep the magnetic flux of the iron core in the transformer less than the saturation magnetic flux. When the excitation inrush current occurs, the inverter controls reduction of the output voltage of the conversion circuit via the controller, to exit the saturation magnetic flux, so as to avoid the excitation inrush current generated because the magnetic flux of the iron core in the transformer is saturated, and prevent a midpoint potential divergence of the inverter and damage to the inverter. In addition, the controller may further recover the output voltage of the conversion circuit, and a process of recovering the voltage does not cause the magnetic flux to be saturated again, thereby avoiding failure of the entire power grid caused by maintaining of a low voltage level, and improving power supply reliability of the power grid power supply system.

The following describes, with reference to FIG. 4 to FIG. 7, an example of the inverter provided in embodiments of this application. In some feasible implementations, when the inverter is connected to the alternating current power grid through full-voltage hard switching (or is connected to the alternating current power grid through no-load switch-on), the inverter may detect whether the excitation inrush current occurs. The inverter may obtain the output current of the conversion circuit via the controller, and when the output current of the conversion circuit is greater than the current threshold, determine that the excitation inrush current occurs. The controller may control reduction of the output voltage of the foregoing conversion circuit, to enable the magnetic flux of the iron core in the foregoing transformer to be less than the saturation magnetic flux to reduce the excitation inrush current. Further, after the controller reduces the output voltage, the inverter may further adjust the output voltage of the conversion circuit via the controller based on the phase (which may be a first phase for ease of description) that is of the output voltage of the conversion circuit and that is during reduction of the output voltage, the remnant magnetism that is of the iron core in the transformer and that is before and after the output voltage is reduced, the maximum value of the output voltage that is of the conversion circuit and that is after the output voltage is reduced, the target voltage value, and the angular frequency of the output voltage of the conversion circuit. Herein, the controller may increase the output voltage of the foregoing conversion circuit to the target voltage value, and keep the magnetic flux of the iron core in the foregoing transformer less than the saturation magnetic flux. When the excitation inrush current occurs, the inverter controls reduction of the output voltage of the conversion circuit via the controller, to exit the saturation magnetic flux, so as to avoid the excitation inrush current generated because the magnetic flux of the iron core in the transformer is saturated, and prevent the midpoint potential divergence of the inverter and the damage to the inverter. In addition, the controller may further recover the output voltage of the conversion circuit, and a process of recovering the voltage does not cause the magnetic flux to be saturated again, thereby avoiding the failure of the entire power grid caused by maintaining the low voltage level, and improving the power supply reliability of the power grid power supply system.

In some feasible implementations, the magnetic flux of the iron core in the transformer may include alternating current magnetic flux and direct current magnetic flux. When the output current of the conversion circuit is greater than the current threshold, the controller may reduce the output voltage of the conversion circuit to reduce the alternating current magnetic flux of the iron core in the transformer until a sum of the alternating current magnetic flux of the iron core in the transformer and direct current magnetic flux generated by the transformer when the controller reduces the voltage is less than the saturation magnetic flux. Specifically, the magnetic flux of the iron core in the transformer (which may be the magnetic flux in the iron core in the transformer) may be expressed as:

$$\varphi(t) = -\varphi_m\cos(\omega t + a) + (\varphi_r + \varphi_m\cos a)e^{-\left(\frac{R}{L}\right)t} = \varphi_s + \varphi_p$$

ω is the angular frequency of the output voltage of the conversion circuit in the inverter, a is an initial phase angle of the output voltage of the conversion circuit, R and L are respectively resistance and inductance of primary-side winding of the transformer, and $\varphi_r$ is the remnant magnetism of the iron core in the transformer. Herein, "$-\varphi_m \cos(\omega t+a)$" in the foregoing expression represents the alternating current magnetic flux (or steady-state magnetic flux), and may be represented by $\varphi_s$.

$$"(\varphi_r + \varphi_m\cos a)e^{-\left(\frac{R}{L}\right)t}"$$

in the foregoing expression represents the direct current magnetic flux (or temporary-state magnetic flux), and may be represented by $\varphi_p$. $\varphi_m$ may be expressed as follows:

$$\varphi_m = \frac{U_m}{\omega}$$

$U_m$ is a maximum value of the output voltage of the conversion circuit in the inverter and the target voltage value. When the controller may detect that the output current of the conversion circuit is greater than the current threshold, in other words, the excitation inrush current is generated because the total magnetic flux of the inverter is far greater than the saturation magnetic flux of the iron core, the controller may reduce the output voltage of the conversion circuit, so that the output voltage of the conversion circuit is reduced (a value of $U_m$ is reduced, and therefore, a value of $\varphi_m$ is reduced), and the alternating current magnetic flux $\varphi_s$ of the inverter is also accordingly reduced. When the alternating current magnetic flux of the inverter is continuously reduced (which may be that the alternating current magnetic flux is lower than first preset magnetic flux), the total magnetic flux of the inverter may exit a saturation region (in other words, be less than the saturation magnetic flux) as the alternating current magnetic flux is reduced, in other words, the sum of the alternating current magnetic flux of the iron core in the transformer and the direct current magnetic flux (which may be first direct current magnetic flux) generated by the transformer when the controller reduces the voltage is less than the saturation magnetic flux. When the excitation inrush current occurs, the inverter controls reduction of the output voltage of the conversion circuit via the controller, to exit the saturation magnetic flux, so as to avoid the excitation inrush current generated because the magnetic flux of the iron core in the transformer is saturated, and prevent the midpoint potential divergence of the inverter and the damage to the inverter.

In some feasible implementations, after reducing the output voltage, the controller may further obtain a second phase based on the phase (which may be the first phase) that is of the output voltage of the conversion circuit and that is during reduction of the output voltage, the remnant magnetism that is of the iron core in the transformer and that is before and after the output voltage is reduced, the maximum value of the output voltage that is of the conversion circuit and that is after the output voltage is reduced, the target voltage value, and the angular frequency of the output voltage, and increase the output voltage of the conversion circuit when the phase of the output voltage of the conversion circuit is equal to the second phase. Specifically, when the controller reduces the output voltage, the first phase of the output voltage of the conversion circuit may be "$\omega t+a1$", that is, the initial phase angle is a1, and direct current magnetic flux (which may be the first direct current magnetic flux for ease of description) of the transformer in this case may be $$"(\varphi_r + \varphi_m \cos a1)e^{-\left(\frac{R}{L}\right)t}".$$

If an initial phase angle of the second phase during increase of the output voltage is a2, an expression is as follows:

$$(\varphi_{r1} + \varphi_{m1}\cos a1)e^{-\left(\frac{R}{L}\right)t} = (\varphi_{r2} + \varphi_{m2}\cos a2)e^{-\left(\frac{R}{L}\right)t}$$

An expression of the initial phase angle a2 may be obtained based on the foregoing expression:

$$a2 = \arccos\bigl((\varphi_{r1} + \varphi_{m1}\cos a1 - \varphi_{r2})/\varphi_{m2}\bigr)$$

$\varphi_{r1}$ is the remnant magnetism that is of the iron core in the transformer and that is before the controller reduces the output voltage, $\varphi_{m1}$ is alternating current magnetic flux (which may be obtained according to $U_{m1}/\omega$, where $U_{m1}$ is the maximum value of the output voltage that is of the conversion circuit and that is after the output voltage is reduced) that is after the controller reduces the output voltage, $\varphi_{r2}$ is the remnant magnetism that is of the iron core in the transformer and that is after the controller reduces the output voltage (or before the controller increases the output voltage), $\varphi_{m2}$ is alternating current magnetic flux that is after the controller increases the output voltage (which can be obtained according to $U_{m2}/\omega$, where $U_{m2}$ is a maximum voltage value corresponding to the target voltage value). $\varphi_{r1}$ may be expressed as follows:

$$\varphi_{r1}(t) = -\varphi_{m0}\cos(\omega t + a0) + (\varphi_{r0} + \varphi_{m0}\cos a0)e^{-\left(\frac{R}{L}\right)t}$$

$\varphi_{m0}$ is alternating current magnetic flux corresponding to a rated voltage, a0 is an initial phase angle of the output voltage of the conversion circuit during full-voltage hard switching, and $\varphi_{r0}$ is remnant magnetism (which may be 0), of the iron core in the transformer, before full-voltage hard switching. The foregoing $\varphi_{r2}$ may be represented as follows:

$$\varphi_{r2}(t) = -\varphi_{m1}\cos(\omega t + a1) + (\varphi_{r1} + \varphi_{m1}\cos a1)e^{-\left(\frac{R}{L}\right)t}$$

The second phase obtained based on the initial phase angle a2 may be "$\omega t+a2$". The controller increases the output voltage of the conversion circuit when the phase of the output voltage of the conversion circuit is equal to the second phase. In this case, direct current magnetic flux (which may be second direct current magnetic flux for ease of description) generated by the transformer may be $$"(\varphi_r + \varphi_m \cos a2)e^{-\left(\frac{R}{L}\right)t}".$$

Herein, the direct current magnetic flux generated when the controller increases the output voltage of the conversion circuit and the direct current magnetic flux generated when the controller reduces the output voltage of the conversion circuit are in opposite directions.

In this case, a sum of the first direct current magnetic flux $$"(\varphi_r + \varphi_m \cos a1)e^{-\left(\frac{R}{L}\right)t}"$$

and the second direct current magnetic flux $$"(\varphi_r + \varphi_m \cos a2)e^{-\left(\frac{R}{L}\right)t}"$$

is not greater than 0. The controller increases the voltage of the output end when the phase of the output voltage of the conversion circuit is the second phase, so that pieces of the direct current magnetic flux generated by the inverter during voltage increase and reduction are offset, and the sum of the alternating current magnetic flux after voltage increase and the offset direct current magnetic flux still does not exceed the saturation magnetic flux, so as to ensure that the magnetic flux of the iron core in the transformer is still less than the saturation magnetic flux after the output voltage of the conversion circuit is increased (which may be that the output voltage reaches the target voltage value). The controller may recover the output voltage of the conversion circuit, and a process of recovering the voltage based on the second phase does not cause the magnetic flux to be saturated again, thereby avoiding the failure of the entire power grid caused by maintaining the low voltage level, and improving the power supply reliability of the power grid power supply system.

Figure 4:
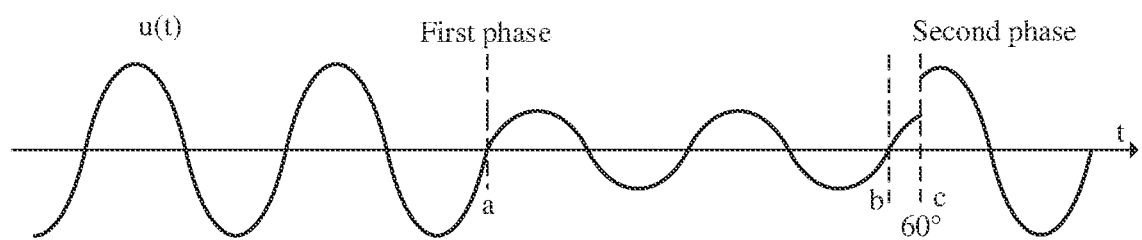
FIG. 4 is a schematic diagram of controlling an output voltage of a conversion circuit of an inverter according to this application.

In some feasible implementations, refer to FIG. 4 that is a schematic diagram of controlling an output voltage of a conversion circuit of an inverter according to this application. As shown in FIG. 4, when detecting an excitation inrush current, the foregoing controller may control reduction of the output voltage u(t) of the conversion circuit. A phase that is of the output voltage of the conversion circuit and that is during reduction of the output voltage may be a first phase (for example, a phase, of the output voltage, corresponding to point a in FIG. 4). The controller may obtain an initial phase angle corresponding to a second phase and the second phase based on the first phase, the remnant magnetism that is of the iron core in the transformer and that is before and after the output voltage is reduced, the maximum value of the output voltage that is of the conversion circuit and that is after the output voltage is reduced, the target voltage value, and the angular frequency of the output voltage that are mentioned above. For example, if a phase difference between the obtained second phase and the first phase is 60 degrees, the controller may increase the output voltage of the conversion circuit when a difference between a phase of the output voltage of the conversion circuit and the first phase is 60 degrees, or an integer number of periodicities plus 60 degrees (where for example, in FIG. 4, a difference between the phase, of the output voltage, corresponding to the point a and that of point b is two periodicities, a difference between the phase, of the output voltage, corresponding to the point a and that of point c is two periodicities plus 60 degrees, and the output voltage of the conversion circuit may be increased at the point c in this case). The controller increases the voltage of an alternating current end when the phase of the output voltage of the conversion circuit is the second phase (or the second phase plus an integer number of periodicities), so that pieces of direct current magnetic flux generated by the inverter during voltage increase and reduction are offset, and a sum of alternating current magnetic flux after voltage increase and the offset direct current magnetic flux still does not exceed saturation magnetic flux, so as to ensure that magnetic flux of the iron core in the transformer is still less than the saturation magnetic flux after the output voltage of the conversion circuit is increased (which may be that the output voltage reaches the target voltage value).

In some feasible implementations, the controller is further configured to: when an output current of the conversion circuit is not greater than the foregoing current threshold, control output resistance of the inverter to increase, so as to increase impedance of a transmission line between the inverter and the foregoing alternating current power grid. Specifically, in the foregoing expression $$"(\varphi_r + \varphi_m \cos a)e^{-\left(\frac{R}{L}\right)t}"$$

of the direct current magnetic flux of the inverter, the direct current magnetic flux is attenuated exponentially with time, and an attenuation speed of the direct current magnetic flux is proportional to an impedance R/L ratio of the transmission line between the inverter and the alternating current power grid. That is, the attenuation speed of the direct current magnetic flux may be accelerated by reconstructing the impedance of the transmission line. For example, the output resistance R of the inverter may be controlled to increase, or output inductance L may be controlled to be reduced, so that the R/L ratio is increased. The impedance of the transmission line is increased to accelerate the attenuation speed of the direct current magnetic flux, to further avoid the excitation inrush current generated because the magnetic flux of the iron core in the transformer is saturated, and prevent a midpoint potential divergence of the inverter and damage to the inverter.

Figure 5:
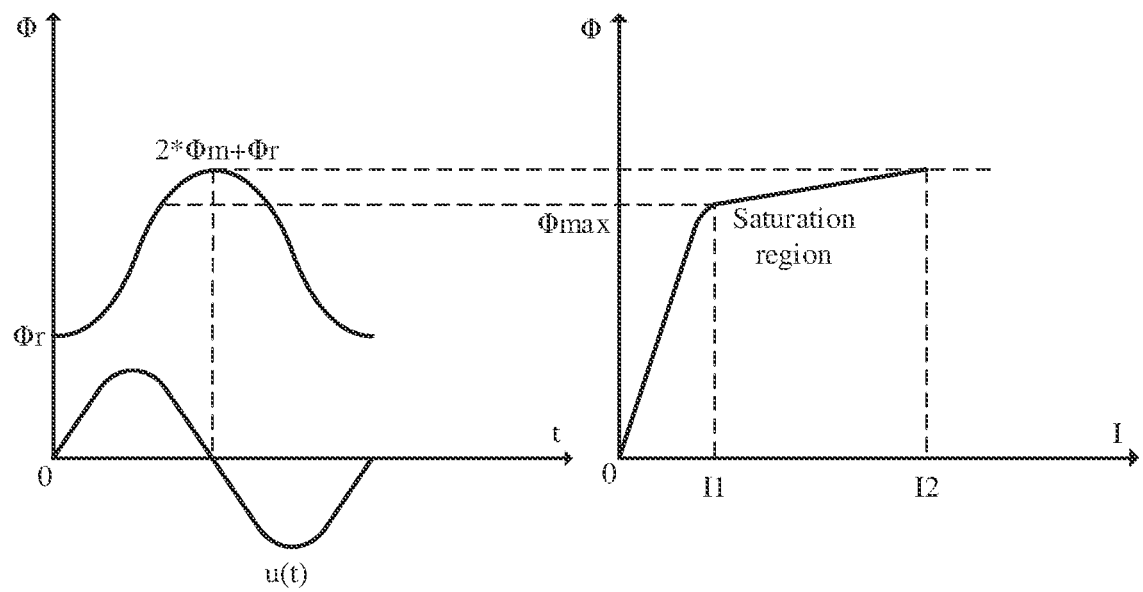
FIG. 5 is a schematic diagram of a relationship between magnetic flux of an inverter and an output voltage according to this application.
Figure 6:
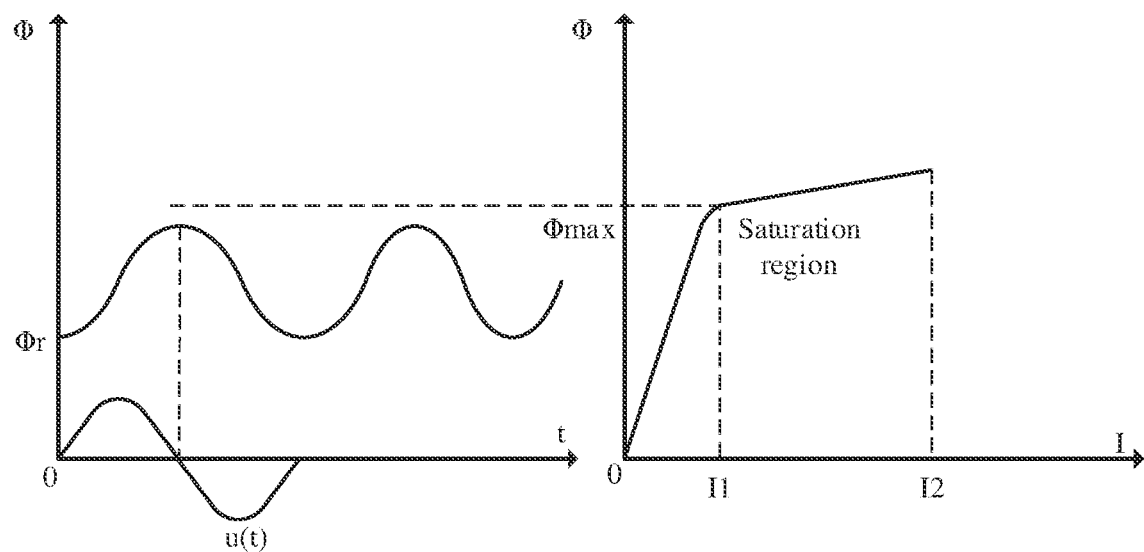
FIG. 6 is another schematic diagram of a relationship between magnetic flux of a transformer and an output voltage according to this application.

In some feasible implementations, refer to FIG. 5 that is a schematic diagram of a relationship between magnetic flux of an inverter and an output voltage according to this application. As shown in FIG. 5, when u(t)=0, the inverter is connected to an alternating current power grid through full-voltage hard switching (or is connected to the alternating current power grid through no-load switch-on). In this case, an iron core in a transformer generates magnetic flux $-\varphi_m$, because the magnetic flux in the iron core cannot suddenly change, an aperiodic component of $\varphi_m$ needs to be generated to offset $-\varphi_m$. In addition, an impact of remnant magnetism $\varphi_r$ of the transformer is considered. In this way, maximum magnetic flux $(2^*\varphi_m+\varphi_r)$ is generated after half a periodicity of full-voltage hard switching, and this value is much greater than saturation magnetic flux $\varphi_{max}$ of the transformer. Before the magnetic flux of the iron core in the transformer is saturated, an excitation current is very small, and a value (which may be a current size of I1 in FIG. 5 or less) is negligible. When the magnetic flux of the iron core in the transformer exceeds the saturation magnetic flux, an excitation current increases sharply, and this excitation current is called an excitation inrush current of the inverter. For example, as shown in FIG. 5, when the inverter generates the maximum magnetic flux $(2^*\varphi_m+\varphi_r)$, a size of a corresponding excitation inrush current is 12 that is much greater than I1, while an excessively large excitation inrush current causes a midpoint potential divergence of the inverter and damage to the inverter. FIG. 6 is another schematic diagram of a relationship between magnetic flux of a transformer and an output voltage according to this application. As shown in FIG. 6, when an output voltage u(t) of an inverter is reduced, magnetic flux of an iron core in the transformer can exit saturation magnetic flux (less than the saturation magnetic flux $\varphi_{max}$). In this case, an excitation inrush current is greatly reduced when the magnetic flux of the iron core in the transformer is not saturated, to prevent a midpoint potential divergence of the inverter and damage to the inverter.

In this application, a controller in the inverter may obtain an output current of a conversion circuit, and when the output current of the conversion circuit is greater than a current threshold, determine that the excitation inrush current occurs. When the output current of the conversion circuit is greater than the current threshold, the controller may reduce the output voltage of the conversion circuit until a sum of alternating current magnetic flux in the iron core in the transformer and first direct current magnetic flux generated by the transformer when the controller reduces the voltage is less than the saturation magnetic flux, thereby avoiding the excitation inrush current generated because the magnetic flux of the transformer is saturated, and preventing the midpoint potential divergence of the inverter and the damage to the inverter. After reducing the output voltage, the controller may further obtain a second phase based on a first phase that is of the output voltage of the conversion circuit and that is during reduction of the output voltage, remnant magnetism that is of the iron core in the transformer and that is before and after the output voltage is reduced, a maximum value of an output voltage that is of the conversion circuit and that is after the output voltage is reduced, a target voltage value, and angular frequency of the output voltage, and increase the output voltage of the conversion circuit when a phase of the output voltage of the conversion circuit is equal to the second phase. A sum of second direct current magnetic flux generated when the controller increases the voltage and the foregoing first direct current magnetic flux is not greater than zero. The controller increases the voltage of an output end when the phase of the output voltage of the conversion circuit is the second phase, so that pieces of the direct current magnetic flux generated by the transformer during voltage increase and reduction are offset, and the sum of the alternating current magnetic flux after voltage increase and the offset direct current magnetic flux still does not exceed the saturation magnetic flux, so as to ensure that the magnetic flux of the iron core in the transformer is still less than the saturation magnetic flux after the output voltage of the conversion circuit is increased (which may be that the output voltage reaches the target voltage value), to prevent failure of the entire power grid caused by maintaining of a low voltage level, and improve power supply reliability of a power grid power supply system. The foregoing controller may further increase impedance of a transmission line to accelerate an attenuation speed of direct current magnetic flux that is in the transformer, to further avoid the excitation inrush current generated because the magnetic flux of the iron core in the transformer is saturated, and prevent the midpoint potential divergence of the inverter and the damage to the inverter.

Figure 7:
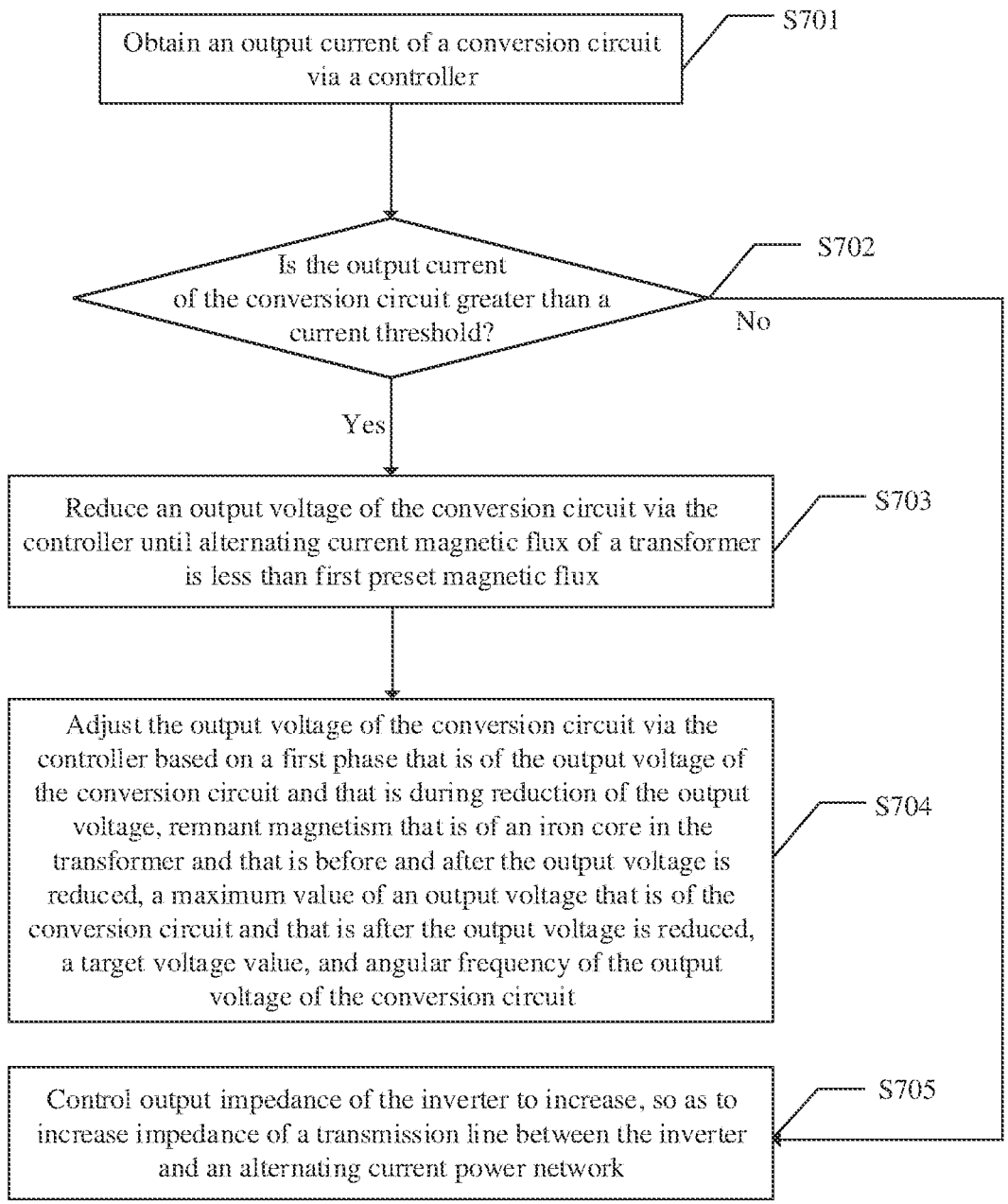
FIG. 7 is a schematic flowchart of a method for controlling an excitation inrush current in a power grid power supply system according to this application.

FIG. 7 is a schematic flowchart of a method for controlling an excitation inrush current in a power grid power supply system according to this application. The method for controlling an excitation inrush current in a power grid power supply system provided in this application is applicable to an inverter in any one of the power grid power supply systems shown in FIG. 1 to FIG. 6. The inverter includes a conversion circuit and a controller. An input end of the inverter is coupled to a power supply that is in the power grid power supply system, and an output end of the converter is coupled to an alternating current power grid. As shown in FIG. 7, the method for controlling an excitation inrush current in a power grid power supply system provided in this application includes the following steps.

S701: Obtain an output current of the conversion circuit via the controller.

S702: Determine whether the output current of the conversion circuit is greater than a current threshold; and if a result of the determining is yes, perform step S703; or if a result of the determining is no, perform step S705.

S703: Reduce an output voltage of the conversion circuit via the controller until alternating current magnetic flux of a transformer is less than first preset magnetic flux.

S704: Adjust the output voltage of the conversion circuit via the controller based on a first phase that is of the output voltage of the conversion circuit and that is during reduction of the output voltage, remnant magnetism that is of an iron core in the transformer and that is before and after the output voltage is reduced, a maximum value of an output voltage that is of the conversion circuit and that is after the output voltage is reduced, a target voltage value, and angular frequency of the output voltage of the conversion circuit.

In some feasible implementations, the controller in the inverter may obtain the output current of the conversion circuit, and when the output current of the conversion circuit is greater than the current threshold, determine that an excitation inrush current occurs. Magnetic flux of the iron core in the transformer may include the alternating current magnetic flux and direct current magnetic flux. When the output current of the conversion circuit is greater than the current threshold, the controller may reduce the output voltage of the conversion circuit until the alternating current magnetic flux of the transformer is less than the first preset magnetic flux. When the alternating current magnetic flux of the transformer is continuously reduced (which may be that the alternating current magnetic flux is lower than the first preset magnetic flux), a sum of the alternating current magnetic flux of the iron core in the transformer and first direct current magnetic flux generated by the transformer when the controller reduces the voltage is less than saturation magnetic flux. When the excitation inrush current occurs, the inverter controls reduction of the output voltage of the conversion circuit via the controller, to exit the saturation magnetic flux, so as to avoid the excitation inrush current generated because the magnetic flux of the iron core in the transformer is saturated, and prevent a midpoint potential divergence of the inverter and damage to the inverter.

In some feasible implementations, after reducing the output voltage, the controller may obtain a second phase based on a phase (which may be the first phase) that is of the output voltage of the conversion circuit and that is during reduction of the output voltage, the remnant magnetism that is of the iron core in the transformer and that is before and after the output voltage is reduced, the maximum value of the output voltage that is of the conversion circuit and that is after the output voltage is reduced, the target voltage value, and the angular frequency of the output voltage, and increase the output voltage of the conversion circuit when the phase of the output voltage of the conversion circuit is equal to the second phase. A phase difference between the first phase and the second phase may be equal to a target interval phase (the first phase is before or behind the second phase by the target interval phase), and a sum of second direct current magnetic flux generated by the iron core in the transformer when the controller increases the voltage and the first direct current magnetic flux is not greater than zero. The controller increases the voltage of the output end when the phase of the output voltage of the conversion circuit is the second phase, so that pieces of the direct current magnetic flux generated by the transformer during voltage increase and reduction are offset, and a sum of alternating current magnetic flux after voltage increase and the offset direct current magnetic flux still does not exceed the saturation magnetic flux, so as to ensure that the magnetic flux of the iron core in the transformer is still less than the saturation magnetic flux after the output voltage of the conversion circuit is increased (which may be that the output voltage reaches the target voltage value). The controller may recover the output voltage of the conversion circuit, and a process of recovering the voltage based on the second phase does not cause the magnetic flux to be saturated again, thereby avoiding failure of the entire power grid caused by maintaining of a low voltage level, and improving power supply reliability of the power grid power supply system.

S705: Control output impedance of the inverter to increase, so as to increase impedance of a transmission line between the inverter and the alternating current power grid.

In some feasible implementations, the direct current magnetic flux of the inverter attenuates exponentially with time, and an attenuation speed of the direct current magnetic flux is proportional to the impedance (related to an R/L ratio) of the transmission line between the inverter and the alternating current power grid. The controller may control output resistance of the inverter to increase, so as to increase the impedance of the transmission line between the inverter and the alternating current power grid, thereby accelerating the attenuation speed of the direct current magnetic flux, to further avoid the excitation inrush current generated because the magnetic flux of the iron core in the transformer is saturated, and prevent the midpoint potential divergence of the inverter and the damage to the inverter.

In this application, the inverter may obtain the output current of the conversion circuit via the controller, and when the output current of the conversion circuit is greater than the current threshold, determine that the excitation inrush current occurs. When the output current of the conversion circuit is greater than the current threshold, the controller may reduce the output voltage of the conversion circuit until the sum of the alternating current magnetic flux in the iron core in the transformer and the first direct current magnetic flux generated by the transformer when the controller reduces the voltage is less than the saturation magnetic flux, thereby avoiding the excitation inrush current generated because the magnetic flux of the transformer is saturated, and preventing the midpoint potential divergence of the inverter and the damage to the inverter. After reducing the output voltage, the controller may further obtain the second phase based on the phase (which may be the first phase) that is of the output voltage of the conversion circuit and that is during reduction of the output voltage, the remnant magnetism that is of the iron core in the transformer and that is before and after the output voltage is reduced, the maximum value of the output voltage that is of the conversion circuit and that is after the output voltage is reduced, the target voltage value, and the angular frequency of the output voltage, and increase the output voltage of the conversion circuit when the phase of the output voltage of the conversion circuit is equal to the second phase. The sum of the second direct current magnetic flux generated when the controller increases the voltage and the first direct current magnetic flux is not greater than zero. The controller increases the voltage of the output end when the phase of the output voltage of the conversion circuit is the second phase, so that the pieces of the direct current magnetic flux generated by the transformer during voltage increase and reduction are offset, and the sum of the alternating current magnetic flux after voltage increase and the offset direct current magnetic flux still does not exceed the saturation magnetic flux, so as to ensure that the magnetic flux of the iron core in the transformer is still less than the saturation magnetic flux after the output voltage of the conversion circuit is increased (which may be that the output voltage reaches the target voltage value), to prevent the failure of the entire power grid caused by maintaining the low voltage level, and improve the power supply reliability of the power grid power supply system. The foregoing controller may further increase the impedance of the transmission line to accelerate the attenuation speed of the direct current magnetic flux that is in the transformer, to further avoid the excitation inrush current generated because the magnetic flux of the iron core in the transformer is saturated, and prevent the midpoint potential divergence of the inverter and the damage to the inverter.

What is claimed is:

1. An inverter, applied to a power grid power supply system, the inverter comprising:
   an input end coupled to a power supply, the power supply being comprised in the power grid power supply system;
   an output end coupled, via a transformer, to an alternating current power grid or a load;
   a conversion circuit; and
   a controller, configured to:
      when an output current of the conversion circuit is greater than a current threshold, reduce an output voltage of the conversion circuit, to enable magnetic flux of an iron core in the transformer to be less than a saturation magnetic flux, to reduce an excitation inrush current; and
      after reducing the output voltage of the conversion circuit, adjust the output voltage of the conversion circuit based on a first phase of the output voltage of the conversion circuit, the magnetic flux of the iron core in the transformer, an output voltage of the conversion circuit after the output voltage is reduced, and a target voltage value, wherein the adjusting increases the output voltage of the conversion circuit to the target voltage value and keeps the magnetic flux of the iron core in the transformer less than the saturation magnetic flux, and wherein the first phase of the output voltage of the conversion circuit is a phase of the output voltage of the conversion circuit that is during the reducing of the output voltage.

2. The inverter according to claim 1, wherein the magnetic flux of the iron core in the transformer comprises alternating current magnetic flux and direct current magnetic flux, and the controller is configured to:
   when the output current of the conversion circuit is greater than the current threshold, reduce the output voltage of the conversion circuit to reduce the alternating current magnetic flux of the iron core in the transformer until a sum of the alternating current magnetic flux of the iron core in the transformer and first direct current magnetic flux generated by the transformer when the controller reduces the voltage is less than the saturation magnetic flux.

3. The inverter according to claim 2, wherein the controller is further configured to:
   obtain a second phase; and
   increase the output voltage of the conversion circuit when a phase of the output voltage of the conversion circuit is equal to the second phase, so that when the output voltage of the conversion circuit reaches the target voltage value, a sum of the alternating current magnetic flux of the iron core in the transformer, the first direct current magnetic flux, and second direct current magnetic flux generated by the transformer when the controller increases the voltage is less than the saturation magnetic flux; and
   wherein the second phase is obtained based on the first phase, the magnetic flux of the iron core in the transformer, the output voltage of the conversion circuit after the output voltage is reduced, and the target voltage value, and wherein the magnetic flux of the iron core in the transformer comprises remnant magnetism that is of the iron core in the transformer and that is before and after the output voltage is reduced.

4. The inverter according to claim 2, wherein the controller is further configured to:
   when the output current of the conversion circuit is not greater than the current threshold, increase a virtual output impedance of the inverter, wherein increasing the virtual output impedance of the inverter increases impedance of a transmission line between the inverter and the alternating current power grid or the load.

5. The inverter according to claim 2, wherein the output end is coupled, via the transformer, to the alternating current power grid.

6. The inverter according to claim 2, wherein the output end is coupled, via the transformer, to the load.

7. A power grid power supply system, comprising:
a power supply; and
an inverter, comprising:
an input end coupled to the power supply;
an output end coupled, via a transformer, to an alternating current power grid or a load;
a conversion circuit; and
a controller, configured to:
when an output current of the conversion circuit is greater than a current threshold, reduce an output voltage of the conversion circuit, to enable magnetic flux of an iron core in the transformer to be less than a saturation magnetic flux, to reduce an excitation inrush current; and
after reducing the output voltage of the conversion circuit, adjust the output voltage of the conversion circuit based on a first phase of the output voltage of the conversion circuit, the magnetic flux of the iron core in the transformer, an output voltage of the conversion circuit after the output voltage is reduced, and a target voltage value, wherein the adjusting increases the output voltage of the conversion circuit to the target voltage value and keeps the magnetic flux of the iron core in the transformer less than the saturation magnetic flux, and wherein the first phase of the output voltage of the conversion circuit is a phase of the output voltage of the conversion circuit that is during the reducing of the output voltage; and
wherein the power supply is configured to provide a direct current input for the inverter.

8. The power grid power supply system according to claim 7, wherein the power grid power supply system further comprises a direct current (DC)/DC converter, and the power supply is coupled to the input end of the inverter through the DC/DC converter; and
wherein the DC/DC converter is configured to:
perform direct current power conversion based on the direct current input provided by the power supply, and output, to the inverter, a direct current obtained through the direct current power conversion.

9. The power grid power supply system according to claim 7, wherein the magnetic flux of the iron core in the transformer comprises alternating current magnetic flux and direct current magnetic flux, and the controller is configured to:
when the output current of the conversion circuit is greater than the current threshold, reduce the output voltage of the conversion circuit to reduce the alternating current magnetic flux of the iron core in the transformer until a sum of the alternating current magnetic flux of the iron core in the transformer and first direct current magnetic flux generated by the transformer when the controller reduces the voltage is less than the saturation magnetic flux.

10. The power grid power supply system according to claim 9, wherein the controller is further configured to:
obtain a second phase; and
increase the output voltage of the conversion circuit when a phase of the output voltage of the conversion circuit is equal to the second phase, so that when the output voltage of the conversion circuit reaches the target voltage value, a sum of the alternating current magnetic flux of the iron core in the transformer, the first direct current magnetic flux, and second direct current magnetic flux generated by the transformer when the controller increases the voltage is less than the saturation magnetic flux; and wherein the second phase is obtained based on the first phase, the magnetic flux of the iron core in the transformer, the output voltage of the conversion circuit after the output voltage is reduced, and the target voltage value, and wherein the magnetic flux of the iron core in the transformer comprises remnant magnetism that is of the iron core in the transformer and that is before and after the output voltage is reduced.

11. A method, applied to an inverter in a power grid power supply system, the power grid power supply system comprising a power supply, a transformer, and the inverter, an input end of the inverter being coupled to the power supply, an output end of the inverter being coupled to an alternating current power grid via the transformer, the inverter comprising a conversion circuit and a controller, and the method comprising:
detecting, by the controller, an output current of the conversion circuit, and reducing an output voltage of the conversion circuit when the output current of the conversion circuit is greater than a current threshold, to enable magnetic flux of an iron core in the transformer to be less than saturation magnetic flux to reduce an excitation inrush current; and
after reducing the output voltage of the conversion circuit, adjusting, by the controller, the output voltage of the conversion circuit based on a first phase of the output voltage of the conversion circuit, the magnetic flux of the iron core in the transformer, an output voltage of the conversion circuit after the output voltage is reduced, and a target voltage value, wherein the adjusting increases the output voltage of the conversion circuit to the target voltage value and keep the magnetic flux of the iron core in the transformer less than the saturation magnetic flux, and wherein the first phase of the output voltage of the conversion circuit is a phase of the output voltage of the conversion circuit that is during the reducing of the output voltage.

12. The method according to claim 11, wherein the magnetic flux of the iron core in the transformer comprises alternating current magnetic flux and direct current magnetic flux, and detecting, by the controller, the output current of the conversion circuit, and reducing the output voltage of the conversion circuit when the output current of the conversion circuit is greater than the current threshold, comprises:
when the output current of the conversion circuit is greater than the current threshold, reducing, by the controller, the output voltage of the conversion circuit until the alternating current magnetic flux of the iron core in the transformer is less than first preset magnetic flux, wherein a sum of the first preset magnetic flux and first direct current magnetic flux generated by the transformer when the controller reduces the voltage is less than the saturation magnetic flux.

13. The method according to claim 12, wherein adjusting the output voltage of the conversion circuit based on the first phase of the output voltage of the conversion circuit, the magnetic flux of the iron core in the transformer, the output voltage of the conversion circuit after the output voltage is reduced, and the target voltage value comprises:
obtaining, by the controller, a second phase, and increasing the output voltage of the conversion circuit when a phase of the output voltage of the conversion circuit is equal to the second phase, wherein the second phase is obtained based on the first phase, the magnetic flux of the iron core in the transformer, the output voltage of the conversion circuit after the output voltage is reduced, and the target voltage value, the magnetic flux of the iron core in the transformer comprises the magnetic flux that is of the iron core in the transformer and that is before and after the output voltage is reduced, and a sum of the first direct current magnetic flux and second direct current magnetic flux that is generated by the transformer when the controller increases the voltage is not greater than zero.

14. The method according to claim 11, further comprising:

when the output current of the conversion circuit is not greater than the current threshold, increasing, by the controller, an output impedance of the inverter, wherein increasing the output impedance of the inverter increases impedance of a transmission line between the inverter and the alternating current power grid, to accelerate attenuation of direct current magnetic flux.

\* \* \* \* \*